US006222443B1

United States Patent
Beeson et al.

(10) Patent No.: US 6,222,443 B1
(45) Date of Patent: Apr. 24, 2001

(54) QUICK RELIABLE POWER AND/OR DATA TRANSFER SYSTEM BETWEEN TOW VEHICLE AND TRAILER VIA HITCH AND HITCH RECEIVER COUPLING

(76) Inventors: Robert D. Beeson, 335 Weirs Rd., Gilford, NH (US) 03246; Jesse D. Beeson, 5460 Silk Oak Way, Sugar Hill, GA (US) 30518

( * ) Notice: Subject to any disclaimer, the term of this patent is extended or adjusted under 35 U.S.C. 154(b) by 0 days.

(21) Appl. No.: 09/556,292

(22) Filed: Apr. 24, 2000

(51) Int. Cl.$^7$ .................................................. G08B 21/00
(52) U.S. Cl. ........................ 340/431; 340/539; 307/9.1; 307/10.1
(58) Field of Search ................................ 340/431, 531, 340/539, 452, 825.06, 825.35; 307/9.1, 10.1, 10.8; 280/422, 423.1, 477, DIG. 14

(56) References Cited

U.S. PATENT DOCUMENTS

| | | | |
|---|---|---|---|
| 4,697,166 | 9/1987 | Warnagiris et al. | 340/310.03 |
| 4,758,836 | 7/1988 | Sculli | 340/870.31 |
| 4,885,563 | 12/1989 | Johnson et al. | 340/310.05 |
| 5,090,779 | 2/1992 | Kramer | 303/7 |
| 5,229,652 | 7/1993 | Hough | 307/104 |
| 5,442,810 | 8/1995 | Jenquin | 455/66 |
| 5,455,466 | 10/1995 | Parks et al. | 307/104 |
| 5,677,667 | * 10/1997 | Lesesky et al. | 340/431 |
| 5,693,985 | 12/1997 | Gee et al. | 307/9.1 |
| 5,854,517 | 12/1998 | Hines | 307/10.8 |
| 5,905,433 | 5/1999 | Wortham | 340/431 |
| 6,100,795 | * 8/2000 | Otterbacher et al. | 340/431 |
| 6,120,052 | * 9/2000 | Capik et al. | 340/431 |

* cited by examiner

Primary Examiner—Van T. Trieu
(74) Attorney, Agent, or Firm—Lacasse & Associates; Kevin E. Greene; Randy W. Lacasse (57) ABSTRACT

A quick reliable power and data transfer system between tow vehicle and trailer via hitch and hitch receiver mechanical coupling. The hitch and hitch receiver couplings are mated for proper towing and are considered to be a physical connection. This system uses this physical connection between trailer and tow vehicle to transfer power and data. The system then eliminates the additional wiring harness interconnections between trailer and tow vehicle, thus increasing the speed of trailer hookup and enhancing the reliability of the power/data transfer. Typical additional wiring harnesses and plugs are often corroded, crushed, severed, difficult to locate and mate in low ambient lighting or are otherwise damaged. This system eliminates the negative effects of these wiring harnesses by using the tow vehicle's hitch to transmit power and data to the trailer. The trailer's hitch receiver then receives the power supply and data as well as transmits data back to the tow vehicle to provide system/trailer status information. Both the tow vehicle and trailer hold a control circuit for operation of the power/data link and trailer subsystems. A preferred embodiment includes additional trailer electrical components/subsystems such as, a trailer lighting and signaling subsystem, status and fault information reporting and an operator display mounted in the tow vehicle to inform/warn the tow vehicle operator. A preferred embodiment includes a non-electrical contact method of power and data transfer via inductive coupling, further enhancing the reliability of the power/data link.

21 Claims, 7 Drawing Sheets

QUICK RELIABLE POWER AND/OR DATA TRANSFER SYSTEM BETWEEN TOW VEHICLE AND TRAILER VIA HITCH AND HITCH RECEIVER COUPLING

BACKGROUND OF THE INVENTION

This invention relates generally to the field of trailer electrical systems, and more particularly to a quick reliable power and/or data transfer system between tow vehicle and trailer via hitch and hitch receiver coupling.

There are many types of trailers in existence, such as cargo, camper and boat trailers. All of these types have at least one thing in common, they have a mechanical coupling called a hitch and hitch receiver. This mechanical coupling is the main load-bearing coupling connecting the tow vehicle to the trailer. One common type of hitch is the "ball type" hitch, whereby the hitch receiver slides over the ball and locks into place. Most often the hitch is mounted on the tow vehicle and the hitch receiver is mounted on the trailer, but this is not always the case. In the case of the tow vehicle being a large 18-wheeler type tractor, the hitch may be mounted on the trailer and the hitch receiver mounted on the tow vehicle. In many cases there will also be some type of safety connection to keep hold of the trailer in the event of the hitch and hitch receiver accidentally de-coupling during tow. These safety connections may consist of chains, bars and/or cables. Depending on the trailer and tow vehicle configuration, there may be other connections for that configuration. The most common additional connection would be air-brake hose couplings in the case of the tractor and trailer.

For safe operation, particularly for operation in low ambient lighting conditions, all vehicles in tow (read trailers) operated on public roadways should have brake lights, running lights and turn indicators. This trailer lighting subsystem necessitates the need for an electrical connection to exist between the tow vehicle and trailer. In addition there also exist trailers with electrical braking systems, which further necessitates the need for electrical connections to exist between the trailer to the tow vehicle. These electrical braking systems assist the tow vehicle's braking system and are typically found on camper type trailers and possibly large boat trailers.

The electrical connections between the tow vehicle and trailer are in the form of wiring harnesses and connector plugs. These harnesses carry several conductors to power the appropriate subsystem/indicator on the trailer. These wiring harnesses and connector plugs transfer electricity from the tow vehicle to the trailer. This type of electrical connection is mainly used to control the trailer lighting subsystem, but the same type of harness and connector is used to power a multitude of other subsystems, such as the electric brakes. Prior art has recognized that a complemental and/or supplemental system is needed for electrical interconnection between tow vehicle and trailer. This recognition stems from the desire to keep electrical wiring harnesses and plug connectors from growing too large in the number of conductors (wires), pins and complexity. One such prior complemental solution creates a data bus by sending/receiving data acoustically through the air-brake lines of a tractor-type tow vehicle and trailer. Another solution uses the electrical properties of the air-brake lines as an electrical conductor for a data bus. Yet another complemental solution utilizes existing dormant conductors in an existing harness and plug to create a data bus. These solutions utilize a microprocessor on the tow vehicle to accept commands and send them via the data bus to a microprocessor on the trailer. The microprocessor on the trailer then interprets the commands and performs some function, such as to turn on the trailer's brake lights. This trailer-mounted microprocessor could also send status information back to the microprocessor on the tow vehicle via the same (or additional) data bus.

It has been recognized that a multi-purpose data bus can help to simplify tow vehicle and trailer electrical interconnections. This data bus can therefore make a small, low conductor-count, wiring harness perform like a large, high conductor-count, wiring harness. It is therefore possible to accommodate almost all trailer electrical needs in very few conductors, thus reducing the size and complexity of these wiring harnesses. Reducing the complexity of the wiring harnesses and connector plugs, by reducing the number of conductors required, improves the reliability of the wiring harnesses and connector plugs a bit.

There are several drawbacks and limitations to using wiring harnesses and plug connectors for tow vehicle and trailer interconnections. When the tow vehicle is not actively towing, the wiring harnesses are not being used. During this period, the plugs can corrode, become crushed or become severed when left dangling from the hitch and exposed to danger. To avoid dangling, the harness is sometimes wrapped around the hitch itself, but still exposed to eventual damage. This wrapping and unwrapping also causes eventual broken wires, which may lead to a difficult to locate failure. These harnesses and connector plugs also remain visible, especially when not in use. Some items such as boat trailers and campers are, for the most part, infrequently used. Such infrequent use leads to the harness and connector troubles indicated. Frequently operated tow vehicles and trailers may avoid some of the common troubles, but exhibit further problems in that the harnesses and connector plugs are subjected to increased wear and tear. As a result, mating one or more harnesses and connector plugs every time a trailer is connected to a tow vehicle could become a time consuming chore. This chore could be further complicated in low ambient lighting conditions. Additionally, the operator could forget to connect the harnesses before towing, thus posing a safety risk and possibly fines. Worse yet, forgetting to disconnect the harnesses after de-coupling the hitch and hitch receiver, thus damaging the harnesses and connector plugs.

The prior systems have used such transmission media as air-brake lines and dormant conductors in wiring harnesses to create a data bus link between the tow vehicle and trailer. While these systems do help to reduce the complexity of the wiring harnesses and connector plugs, the harnesses and plugs are still required. Since the wiring harnesses and connector plugs are still required, the reliability is not at its peak and the system still suffers the same common ailments of harness and plug systems without a data bus. Although the harnesses and plugs may have been reduced in size and complexity, the mating of these plugs and harnesses still may be quite time consuming. Furthermore, some of these solutions, in particular the solutions using air-brake lines, preclude the system's use in a tow vehicle and trailer configuration without air brakes, such as general boat trailers and camper trailers.

SUMMARY OF THE INVENTION

A great achievement in the reliability and speed of electrical interconnections between tow vehicle and trailer has been gained through the use of the hitch and hitch receiver mechanical coupling. The quick reliable power and data transfer system via the hitch and hitch receiver coupling takes advantage of this mechanical connection between tow vehicle and trailer. This system eliminates the need for electrical wiring harness and connector plug interconnections between the tow vehicle and the trailer. By eliminating the harnesses and plugs, the reliability and performance of the tow vehicle-to-trailer electrical system has been enhanced, along with the increase in speed of trailer hookup. The electrical harnesses and plugs are often damaged as a result of neglect when not in use, as well as wear and tear when they are in use. By removing the harnesses and plugs, the danger of common damage to these harnesses and plugs has been removed. When the system is used to power the trailer's lighting subsystem, the safety of general trailer operation has been enhanced as a direct result of this enhancement in the tow vehicle-to trailer electrical system reliability. Note that the discussion considers the hitch to be mounted on the tow vehicle and the hitch receiver to be mounted on the trailer, but this is not always the case, they may be interchanged depending on the type of tow vehicle and trailer in question.

The first embodiment is a system comprising: an inductive coil embedded in a modified hitch for transmitting power and data to a trailer, an inductive coil embedded in a modified hitch receiver as for receiving power and data from tow vehicle, trailer-mounted capacitors for storage of received power, a microprocessor to be located on the tow vehicle for purposes of tow vehicle-side system control and communication, an additional microprocessor to be located on the trailer for purposes of trailer-side system control and communication, a modulator on the tow vehicle for encoding the data to transmit to the trailer, and a demodulator on the trailer for decoding the data sent from the tow vehicle. The overall system's main power is derived from the tow vehicle's power supply, typically direct current (DC) power provided by the primary battery. When the hitch and hitch receiver are mechanically coupled, physically connecting the trailer to the tow vehicle, the hitch-embedded coil forms the primary winding of a transformer which is inductively coupled to the hitch receiver-embedded coil, which forms the secondary winding of this transformer. Thus the hitch and hitch receiver coupling behaves like a transformer, for power and data transmission, as well as continues to be the main mechanical load-bearing coupling between the tow vehicle and trailer. In the case of a ball-type hitch, this is accomplished by embedding an inductive coil within the ball hitch on the tow vehicle and an inductive coil in the ball hitch receiver on the trailer. A data bus utilizing this non-contact inductive link as a transmission medium links the two microprocessors. The tow vehicle's microprocessor monitors the states of tow vehicle control signals, such as the state of the tow vehicle's brake lights, running lights and turn indicators. Based on this gathered information, the microprocessor sends commands to the microprocessor on the trailer via the data bus. This data is encoded by the modulator and sent to a power amplifier/converter. The power amplifier/converter transforms the DC power from the tow vehicle's main power supply to alternating current (AC) power then amplifies this AC power signal along with the modulated data stream, creating a composite signal. This composite signal is fed to the hitch-embedded inductive coil generating a magnetic flux that is coupled to the inductive coil embedded in the hitch receiver, whereby creating a corresponding composite signal of the same frequency in this secondary coil. This corresponding signal is then decoded by the demodulator and presented to the trailer's microprocessor, thus completing the data bus link. The corresponding signal is also presented to a rectifying filter circuit to convert the AC signal to a DC level for powering the trailer's electrical system. This rectified signal is presented to the power supply and storage subsystem where it is used as the trailer's main power source and also used to charge the trailer's power storage components. The power storage elements may consist of one or more batteries, capacitors or similar power storage elements. In this embodiment, capacitors are used to both filter the rectified signal as well as to store power. The power storage elements create a power reserve to accommodate the trailer power supply transients due to varying electrical loads. The power supply and storage subsystem will also create the necessary additional DC voltages to power the trailer's microprocessor and support circuitry, as well as any additional electrical subsystems added to the trailer. Once the trailer's microprocessor receives the data transmission it will perform the requested functions, such as to turn on the trailer's brake lights.

The preferred embodiment of the invention transforms the single direction data bus of the first embodiment to a bidirectional data bus. This is accomplished by adding a demodulator on the tow vehicle, for decoding the data sent back from the trailer and by replacing the demodulator on the trailer with a modem (modulator/demodulator; capable of both modulation and demodulation), for both decoding the data sent from the tow vehicle and encoding the data to send back to the tow vehicle. Note that the modem on the trailer now performs the demodulation of the composite signal from the tow vehicle. Now that information can be returned from the trailer, an operator display to inform the tow vehicle operator as to trailer electrical subsystems' operation is added to the preferred embodiment. Since the hitch and hitch receiver coupling has essentially created a transformer, data can be sent from the trailer to the tow vehicle through this same inductive link, as a transformer can inductively couple signals in both directions. The trailer's microprocessor gathers status/fault information, such as indicating a faulty brake light, and presents it to the modem. The modem then encodes the data by modulating it and passing it on to the trailer hitch receiver-embedded inductive coil. This coil then generates a magnetic flux in response to the signal. This magnetic flux is inductively coupled to the tow vehicle's hitch-embedded inductive coil, creating a corresponding signal of the same frequency. The demodulator on the tow vehicle decodes this corresponding signal and sends it to the tow vehicle's microprocessor. The tow vehicle's microprocessor can then display this status/fault information on the operator display mounted in the tow vehicle's cockpit. Thus the tow vehicle operator is presented with valuable information about the trailer's electrical subsystems.

The use of a non-contact inductively coupled power and data bus has an additional benefit, the entire system may be sealed. A sealed system would thus be waterproof, which is a very important feature when the trailer in question is a boat trailer to be partially/fully submersed in water when loading and unloading a boat. A sealed system would not only continue to operate under such use, but would eliminate the common corrosion of wiring harness connector plugs. The sealed system, without harnesses and plugs, would also eliminate the possibility of damage to the tow vehicle's electrical system from trailer short-circuits due to water contact.

The drawings constitute a part of this specification and include exemplary embodiments to the invention, which may be embodied in various forms. It is to be understood

DETAILED DESCRIPTION OF THE PREFERRED EMBODIMENTS

Figure 1A:
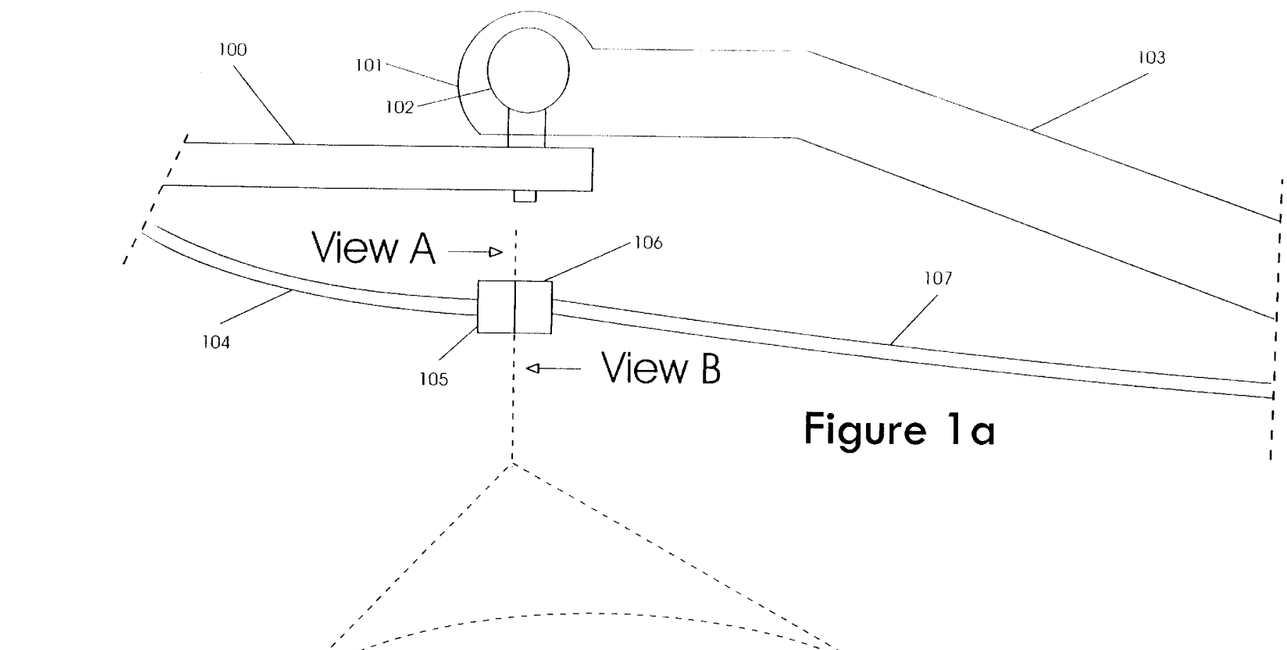
FIGS. 1a and 1b, collectively, illustrate the prior art utilizing pin connectors on a wiring harness for electrical interconnection between tow vehicle and trailer.
Figure 1B:
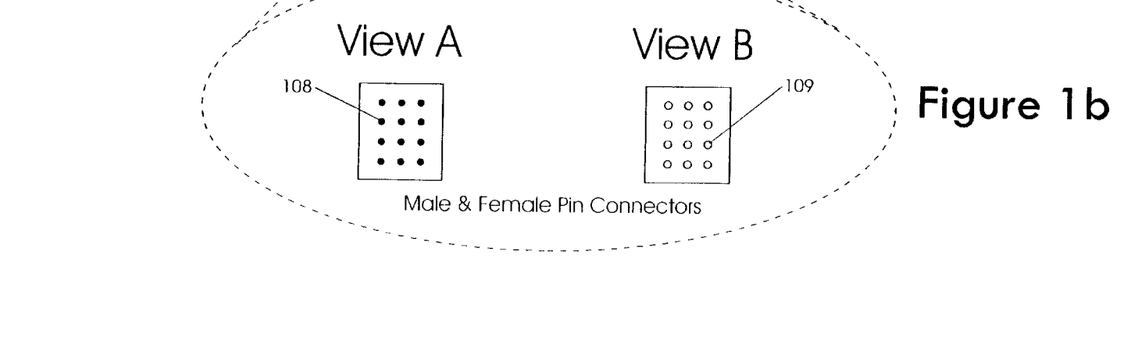

In accordance with prior art, FIGS. 1a and 1b show a contact type electrical interconnection between tow vehicle and trailer. The extension bar 100 is attached to the tow vehicle's frame for support. The hitch 102 mechanically couples to the hitch receiver 101 of the trailer. The hitch receiver is attached to the trailer's frame 103. The tow vehicle side electrical wiring harness 104 couples to the trailer side electrical wiring harness 107 via a plug with pin connections 105 and its mate 106. View-A shows a view into the trailer side electrical plug 106 while View-B shows a view into the tow vehicle side electrical plug 105. The pins 108 and pin receptacles 109 of the trailer plug 106 and tow vehicle plug 105 respectively comprise the core of the prior art.

Figure 2:
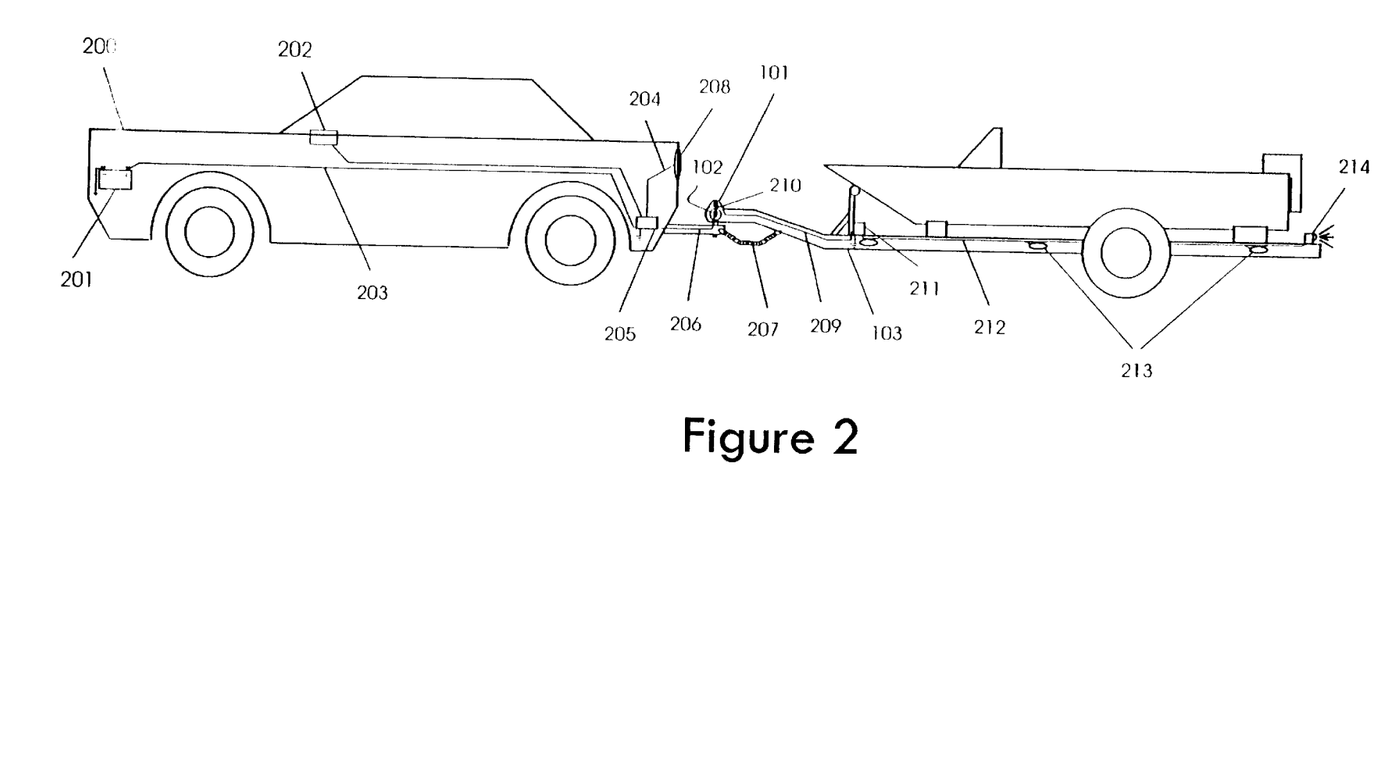
FIG. 2 is a plan view of the preferred embodiment of the invention outlining respective positions of components about the tow vehicle and trailer.

In accordance with the present invention, FIG. 2 shows the preferred embodiment with the tow vehicle as reference item 200 and trailer as reference item 103. In this example, a ball-type hitch 102 is attached to the tow vehicle while the ball hitch receiver 101 is attached to the trailer. Protecting against the possibility of hitch and hitch receiver de-coupling during tow prompts the use of a safety connection, via a chain in this case, between the hitch and hitch receiver assemblies 207. The system shown is capable of bi-directional data communications between the trailer and tow vehicle, complete with a tow vehicle operator informational display 202. The informational display can also be multi-functional, in that it may be used for operator input. This input may perform a number of operator defined additional functions, such as to turn on/off trailer task lighting or control the level of trailer electrical brakes. The primary brain, or controller, of the system 205 resides on the tow vehicle and it is from here the control and operation of the trailer is dictated. The primary power supply for the system is taken from the tow vehicle's primary battery 201 by a relatively large conductor power cable 203. A large conductor wire is identified by a numerically small gauge-number. All references to a large conductor wire or wiring harnesses refer to a gauge of approximately #10 while small conductor wire or wiring harnesses refer to a gauge of approximately #18. The larger conductors are used when high current is required, such as at points of power supply. The actual gauge of the wires used depends on the exact trailer configuration and its power needs, this is known to those skilled in the art and is not further discussed herein. The primary controller monitors tow vehicle based systems, such as the lighting system's brake lights, running lights and turn indicators collectively referred to by item 208. The monitoring of these tow vehicle systems is by wired connections to such systems 204. The hitch 102 has been modified, in that an inductive coil has been embedded within it. This is the inductive coil that forms the primary winding of the transformer created between the hitch and hitch receiver. This coil is under the control of the primary controller 205 and attached therein by a large conductor wiring harness 206. Reference item 210 notes that the core of the hitch's inductive coil is magnetically exposed at the top of the hitch and the core of the hitch receiver's inductive coil is magnetically exposed on the inside of the hitch receiver, shown in more detail by FIG. 5. The preferred embodiment operates the trailer's lighting system, comprised of running lights 213, turn indicators and brake lights both identified by reference item 214. A trailer-based secondary controller is in communication with the tow vehicle-based controller and controls the system operation on the trailer. A control box 211 houses both the secondary controller as well as the power supply and storage subsystem. The control box is connected to the hitch receiver's inductive coil by a large conductor wiring harness 209. The control box is further connected to the individual trailer mounted lights by a small conductor wiring harness 212. Note that all wiring harnesses are fixed in position, no wiring harnesses or connector plugs need to be mated or separated during trailer hookup or detach. As the system is sealed and water tight, these fixed wiring harnesses are not subject to the same dangers as wiring harnesses and connector plugs used to interconnect the tow vehicle and trailer in prior art.

Figure 3:
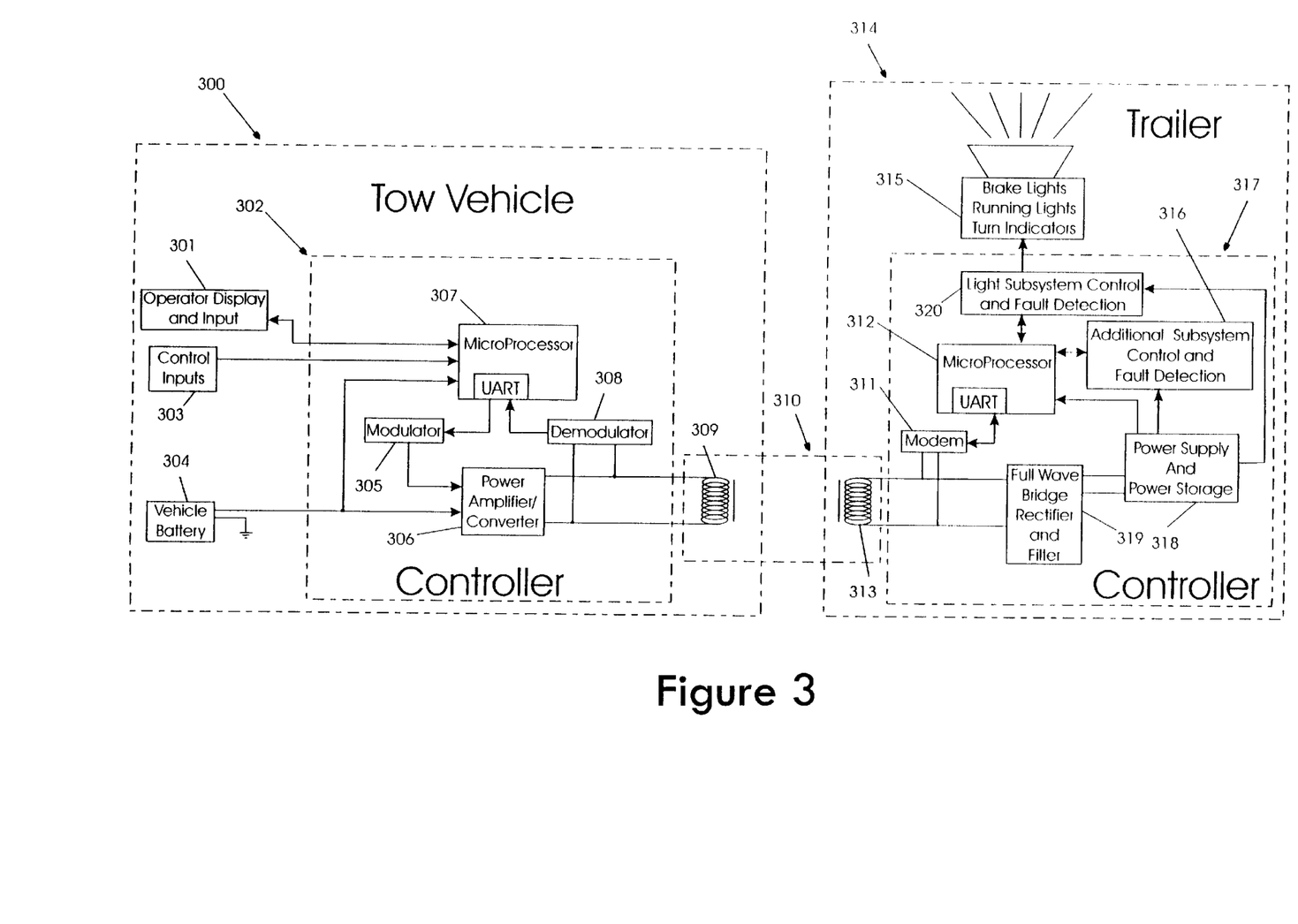
FIG. 3 is a schematic block diagram of the preferred embodiment of the invention's control circuits used on both tow vehicle and trailer.

FIG. 3 depicts the schematic block diagram of the entire system, covering both the tow vehicle based components 300 and the trailer based components 314. The tow vehicle based components 300 are comprised of: a primary power source 304, control inputs 303, operator display and input 301, primary controller 302 and an inductive coil embedded in the hitch 309. The primary controller 302 is comprised of a microprocessor 307, modulator 305, demodulator 308 and a power amplifier/converter 306. Trailer based components 314 are comprised of: a secondary controller 317, an inductive coil embedded in the hitch receiver 313 and individual trailer lights 315. The secondary controller 317 is comprised of: a microprocessor 312, modem 311, a full wave bridge rectifier and filter 319, power supply and power storage subsystem 318, additional subsystem control and fault detection circuitry 316 and trailer lighting subsystem control and fault detection circuitry 320. Reference item 310 identifies those components housed within the hitch and hitch receiver assembly.

The primary microprocessor 307 derives its operating power from the main power supply 304 and determines what to do based on control inputs 303 and operator input via the operator display and input unit 301. These control inputs may be events such as the tow vehicle's brake lights turning on or the operator lowering the level of the trailer's electrical brakes. The primary microprocessor then sends a message to the secondary microprocessor 312 via its UART (Universal Asynchronous Receiver Transmitter) communications port. The UART of the primary microprocessor sends the data to the modulator 305, which encodes the data and presents it to the power amplifier/converter 306. The power amplifier/converter converts the primary power supply's direct current (DC) power to alternating current (AC) power required for transfer through a transformer, then amplifies both this AC power signal and the modulated data, creating an amplified composite signal. This composite signal is then driven to the hitch-embedded coil 309. In response to this signal, the hitch-embedded coil generates a magnetic flux. This magnetic flux is coupled to the hitch receiver-embedded coil 313, creating a corresponding composite signal of the same frequency as a result. This corresponding composite signal is connected to a full wave bridge rectifier and filter circuit 319, where it is converted and filtered to a DC level signal capable of powering the trailer's electrical system and/or charging a power storage element. This DC level signal is fed to the power supply and power storage subsystem 318 where the power storage elements are charged and the DC voltage is converted into additional DC voltages for powering the electrical circuitry of the trailer 314. The rectifier 319 has essentially separated the power from the data. It is the job of the modem 311, which is connected in parallel to the hitch receiver-embedded coil 313, to decode the data sent from the tow vehicle's controller 302 via its demodulation circuitry. This decoded data is presented to the UART of the secondary microprocessor 312, which will then process the data. As a result of processing the data, the secondary microprocessor will control the trailers lights and additional subsystems via the light controller 315 and additional subsystem controller 316 respectively.

The secondary microprocessor 312 may also send data back to the trailer controller 302 via its UART. The UART sends the data to the modem 311, where it is encoded via the modulator circuitry. This modulated data is then presented to the hitch receiver-embedded coil 313, where it generates a magnetic flux in response to the signal. This magnetic flux is coupled to the hitch embedded coil 309 where it generates a corresponding signal of the same frequency as a result. On the tow vehicle's controller 302 there exists a demodulator 308 connected in parallel to the hitch-embedded coil 309. This demodulator decodes the data sent from the trailer and sends it to the primary microprocessor's UART 307 for processing by the microprocessor. The primary microprocessor 307 can then pass information to the tow vehicle operator via the operator display 301.

The modulation and/or demodulation performed by the modem 311, modulator 305 and demodulator 308 may be in frequency, amplitude and/or phase. The exact modulation/demodulation scheme depends on many factors, such as the power consumption of the trailer's electrical system. These factors are well known to those skilled in the art of transformer design and inductive coupling, thus they will not be further discussed herein. The additional subsystems referenced 316 are comprised of manufacturer and/or operator added electrical accessories on the trailer and powered by this system.

Figure 4:
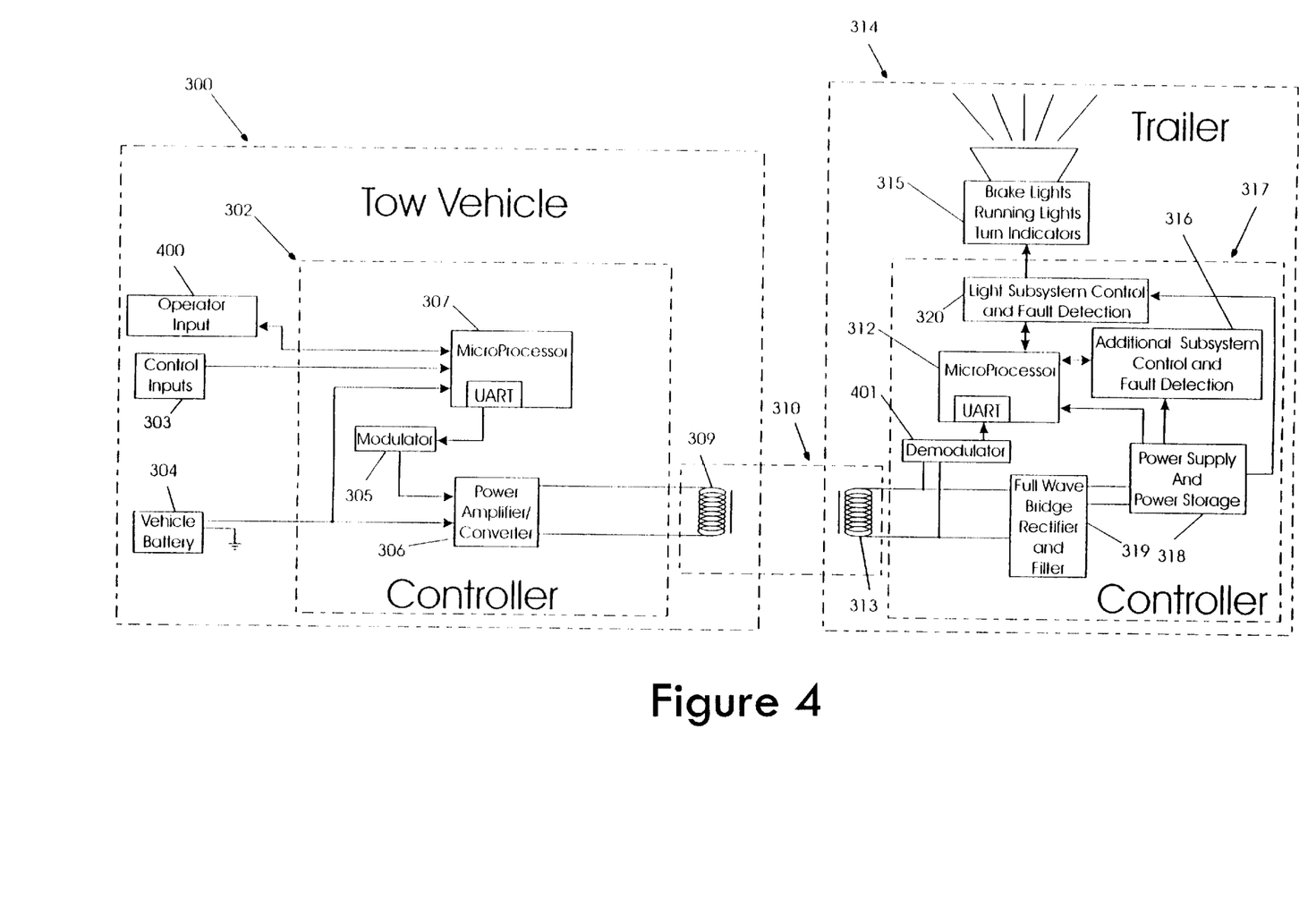
FIG. 4 is a schematic block diagram of an alternate embodiment of the invention's control circuits used on both tow vehicle and trailer when single direction communications is utilized.

In accordance with a further aspect of the invention, FIG. 4 depicts the system schematic block diagram when only single direction communication is required, from tow vehicle to trailer. While not the preferred embodiment, it is quite similar but simpler. Since communication is in a single direction only, there is no tow vehicle operator display unit capable of informing the operator as to the operation of the trailer's electrical system. The tow vehicle based components 300 are comprised of: an operator input panel 400, system control inputs 303, a hitch-embedded inductive coil 309 and a primary controller 302. The primary controller 302 is comprised of: a primary microprocessor 307, modulator 305 and a power amplifier/converter 306. The trailer based components 314 are comprised of: a hitch receiver-embedded inductive coil 313, trailer lighting 315 and a secondary controller 317. The secondary controller 317 is comprised of: a demodulator 401, full wave bridge rectifier and filter circuit 319, secondary microprocessor 312, power supply and power storage subsystem 318, trailer lighting and fault detection circuitry 320 and additional subsystem and fault detection circuitry 316. Reference item 310 identifies those components housed within the hitch and hitch receiver assembly.

The transfer of power from the tow vehicle to the trailer as well as the transfer of data from the tow vehicle to the trailer is identical to the preferred embodiment of FIG. 3. The primary microprocessor 307 derives its operating power from the main power supply 304 and determines what to do based on control inputs 303 and operator input via the operator input unit 400. These control inputs may be events such as the tow vehicle's brake lights turning on or operator lowering the level of the trailer's electrical brakes. Once again the primary microprocessor 307 sends a message to the secondary microprocessor 312 via its UART communications port. The UART of the primary microprocessor sends the data to the modulator 305, which encodes the data and presents it to the power amplifier/converter 306. The power amplifier/converter again converts the primary power supply's direct current (DC) power to alternating current (AC) power and amplifies both this AC power signal and the modulated data, creating an amplified composite signal. This composite signal is then driven to the hitch-embedded coil 309. In response to this signal, the hitch-embedded coil generates a magnetic flux. This magnetic flux is coupled to the hitch receiver-embedded coil 313, creating a corresponding composite signal of the same frequency as a result. This corresponding composite signal is connected to a full wave bridge rectifier and filter circuit 319, where it is converted and filtered to a DC level signal capable of powering the trailer's electrical system and/or charging a power storage element. This DC level signal is fed to the power supply and power storage subsystem 318, where the power storage elements are charged and the DC voltage is converted to additional DC voltages for powering the electrical circuitry of the trailer 314. As in the preferred embodiment, the rectifier 319 has essentially separated the power from the data. It is the job of the demodulator 401, which is connected in parallel to the hitch receiver-embedded coil 313, to decode the data sent from the tow vehicle's controller 302. This decoded data is again presented to the UART of the secondary microprocessor 312, which will then process the data. As a result of processing the data, the secondary microprocessor will control the trailer's lights and additional subsystems via the light controller 320 and additional subsystem controller 316 respectively. A demodulator 401 has been used in place of the modem of the preferred embodiment because the modulation circuitry of the modem is not needed. The modulation circuitry of a modem is not needed because there is no need to send data back from the trailer to the tow vehicle. Since there is no data returning from the trailer, no demodulator is required in the primary controller 302. This results in a simpler and cheaper system that still reaps the benefits of using the hitch and hitch receiver to eliminate wiring harness and connector plug interconnections.

The modulation and/or demodulation performed by the modulator 305 and demodulator 401 may again be in frequency, amplitude and/or phase. The exact modulation/demodulation scheme once again depends on many factors, such as the power consumption of the trailer's electrical system. Again, these factors are well known to those skilled in the art of transformer design and inductive coupling, thus they will not be further discussed herein. The additional subsystems referenced 316 are comprised of manufacturer and/or operator added electrical accessories on the trailer and powered by this system.

Figure 5:
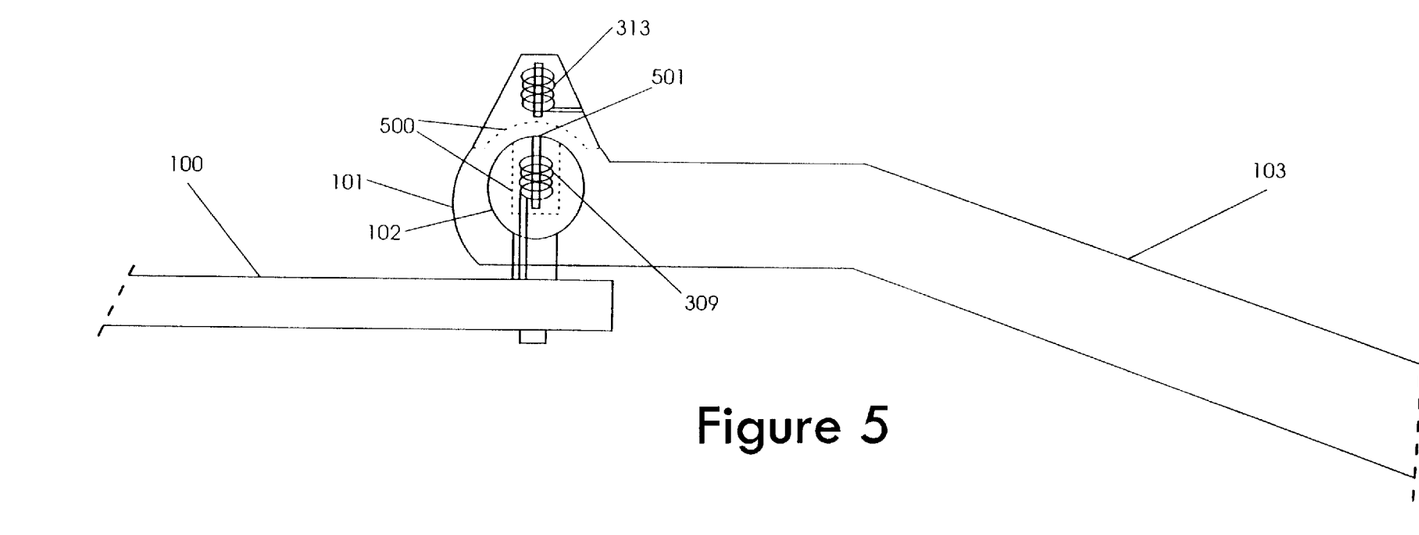
FIG. 5 is an illustration of the inductive coil installation within the hitch and hitch receiver coupling for the preferred embodiment of the invention.

Having observed the details of the power and/or data transmission and reception, further attention may now be given to the hitch and hitch receiver, depicted in FIG. 5. Since the hitch is load-bearing, it is normally bolted to an extension bar 100 which is then fixed to the tow vehicle's frame. The hitch receiver is also load-bearing and is fixed to the trailer's frame 103. In this example, the tow vehicle's chassis is connected to the electrical system's ground potential, as shown by the connection of the primary tow vehicle battery's (FIG. 2–201) negative terminal to ground. In most cases the hitch has not been electrically isolated from the tow vehicle's chassis. Noting that the hitch 102 and hitch receiver 101 are most often constructed of steel for strength, they are also grounded. This is the reasoning for insuring the cores of the inductive coils are magnetically exposed to one another 501, to guard against the magnetic shielding effects of the grounded hitch and hitch receiver assembly. Both coils would be potted with some electrical insulation material 500 that is transparent to magnetic flux, such as a plastic capable of withstanding the wide temperature extremes that a tow vehicle operates under. This material would electrically isolate the coils from the hitch's 102 and hitch receiver's 101 housings, while still allowing the magnetic flux to flow through it, inductively linking the two coils. Embedding the coil 309 within the hitch 102 requires some of the hitch material to be removed. The amount removed depends on the size of the coil, which further depends on the power needs of the trailer. A greater electrical load (higher power requirements) on the trailer means larger coils 309, 313. However, removing some of the hitch's material may structurally weaken it. The hitch receiver could also be structurally weakened when its coil is embedded, but to a much lesser extent. If the hitch is weakened to a great extent, the hitch and hitch receiver may de-couple during tow, possibly causing material damage as well as posing a safety hazard. Hitch assemblies are typically rated in the amount of weight (capacity) they can tow. Once the final power requirements of the trailer are known, based on the needs of the electrical subsystems chosen for a given trailer, the coil sizes would then also be known. The modified hitch 102 with coil 309 embedded within and the modified hitch receiver 101 with coil 313 embedded within must be tested to determine its final towing capacity.

While embedding of the inductive coil in the hitch and hitch receiver is preferred, it is within the spirit and scope of the present invention to locate the wireless transmitter and receiver in any appropriate mechanical connection. For instance, the safety chains, bars, or cables may have the transmitter or receiver attached thereto or embedded therein. The placement of the transmitter and/or the receiver will depend upon design considerations, such as, communication medium, costs, complexity of the system, etc.

Figure 6A:
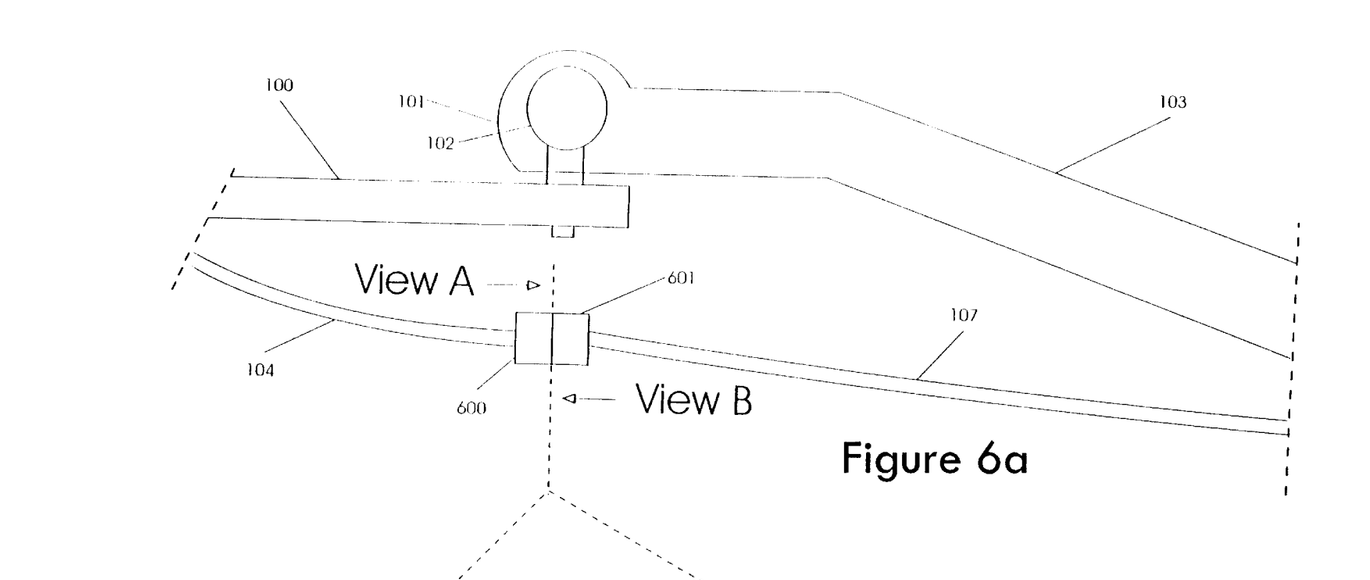
FIGS. 6a and b, collectively, illustrate an alternate embodiment that replaces the pin connections of prior art with non-contact inductive coils.
Figure 6B:
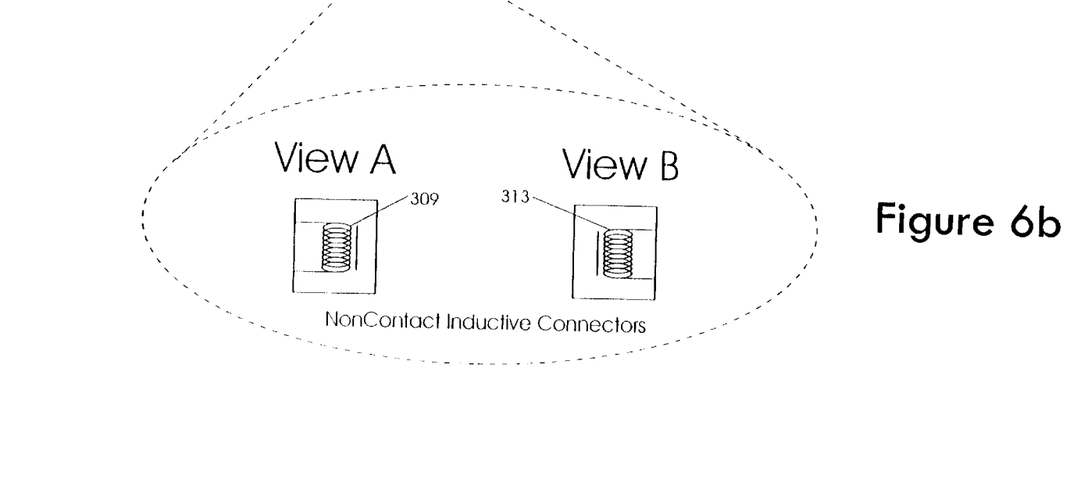

FIGS. 6a and 6b depict yet another alternate embodiment of the invention. Again, the extension bar 100 is attached to the tow vehicle's frame for support. The hitch 102 mechanically couples to the hitch receiver 101 of the trailer. The hitch receiver is attached to the trailer's frame 103. The tow vehicle side electrical wiring harness 104 couples to the trailer side electrical wiring harness 107 via a plug 600 with an inductive coil 309 embedded within and its mate 106, also with an inductive coil embedded within 313. View-A shows a view into the trailer side electrical plug 601 while View-B shows a view into the tow vehicle side electrical plug 600. The tow vehicle side inductive coil 309 and the trailer side inductive coil 313 of the tow vehicle plug 600 and trailer plug 601 respectively show how the non-contact inductive link can be realized without embedding the coils directly within the hitch and hitch receiver. This embodiment eliminates the common damage to wiring harness plugs using contacts such as pins and pin receivers. The embodiment further reduces incompatibility issues with different types of contact types and sizes.

Figure 7:
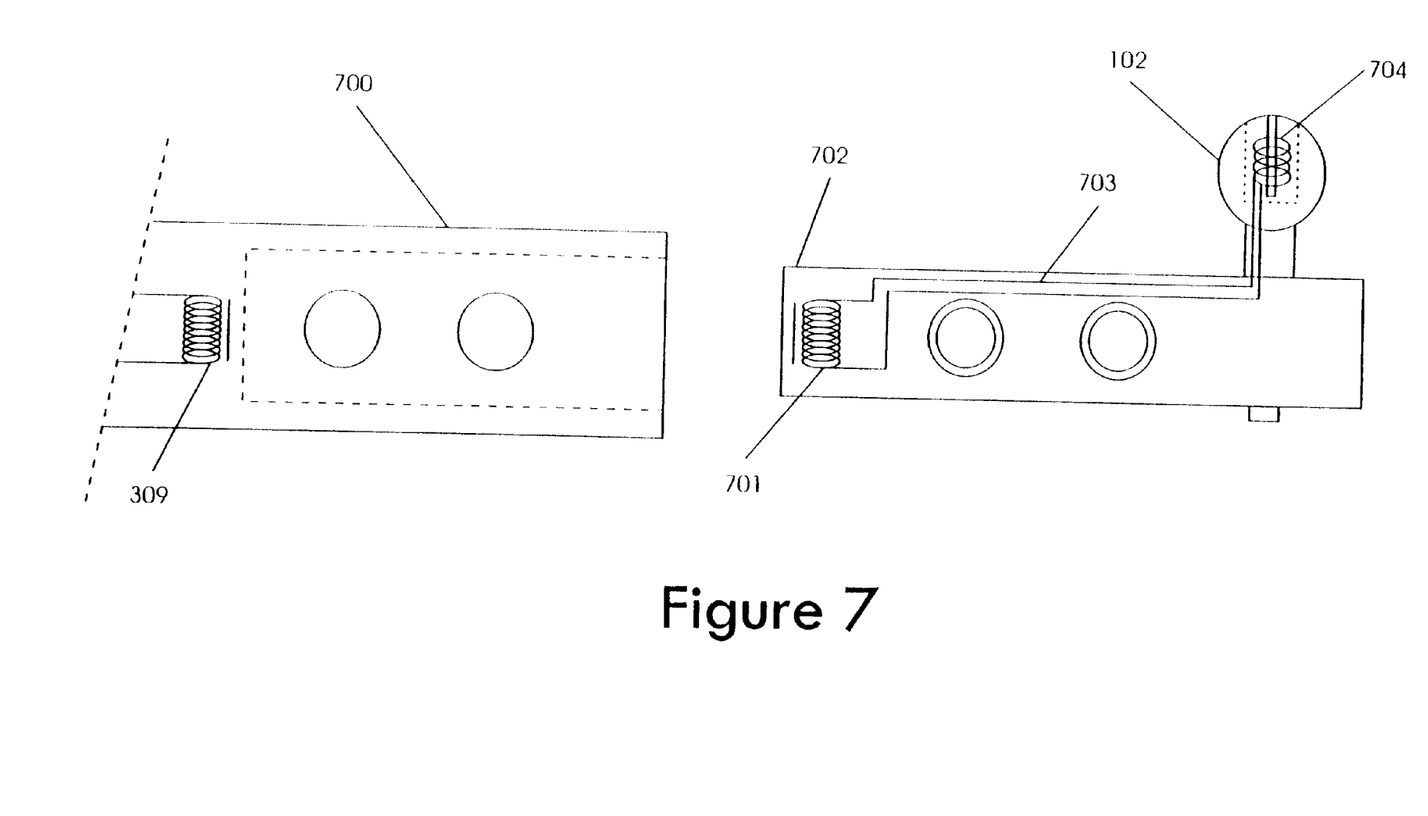
FIG. 7 is an illustration of the non-contact inductive coil installation in a modular type hitch, where the hitch itself can easily be removed from the tow vehicle.

FIG. 7 shows the adaptation of the invention for use with a modular type hitch. The modular type hitch is comprised of the hitch bar 702 and hitch bar receiver 700. The hitch bar receiver 700 is permanently attached to the tow vehicle, typically to the frame. The hitch bar 702 can be removed from the hitch bar receiver 700 when not in use. The hitch bar slides into the hitch bar receiver and a retaining pin holds the two together. The tow vehicle side inductive coil 309 inductively couples to an inductive coil 701 embedded within the hitch bar 702. This coil 701 is connected to another inductive coil 704 embedded within the hitch itself 102 by a wiring harness 703. A composite signal is driven to the hitch bar receiver embedded coil 309, which creates a magnetic flux in response. This magnetic flux couples to the hitch bar embedded inductive coil 701 producing a corresponding composite signal of the same frequency. This signal is directly driven to the hitch embedded coil 704 by the wiring harness 703. This arrangement allows the benefits of both the modular type hitch to coexist with the benefits of the non-contact electrical interconnection between a tow vehicle and trailer.

Conclusion

A system and method has been shown in the above embodiments for the implementation of quick, reliable transmission of power or data signals between a tow vehicle and a trailer. While various preferred embodiments have been shown and described, it will be understood that there is no intent to limit the invention by such disclosure, but rather, it is intended to cover all modifications and alternate constructions falling within the spirit and scope of the invention. For simplicity, the use of a microprocessor is preferred, however, any appropriate control circuitry, such as an ASIC, FPGA or discrete components, can be utilized in the implementation of the present invention. The use of an inductive link to transmit the operational signals provides for many advantages, however, any appropriate, non-contact transmitter and transmitting medium may be utilized. For example, electromagnetic, optical, or acoustic transmitters and mediums are appropriate, based upon various design considerations.

Additionally, in all of the embodiments described, a single transmitter has been illustrated. The present invention should not be seen as limited by such disclosure. It is within the spirit of the present invention to utilize more than one transmitter to transmit in a parallel manner. For instance, separate transmitters, one for data, the other for power, is a suitable implementation of the present invention. In addition, the operational signals transmitted by the mechanical connection may be the power supply signal, while the data signals are transmitted via another transmission technique not tied to the mechanical connection. Alternatively, the operational signals may be the data signals, while the power is supplied by a battery on the trailer, a generator on the trailer wheel, prior art pin connections, etc. Multiple transmitters, each transmitter corresponding to particular subsystems of the trailer may be utilized to provide parallel transmission of control signals to these subsystems. Two transmitters/receivers utilized in which one transmitter/receiver pair provides the forward link from tow vehicle to trailer, while the second pair provides for the reverse link from trailer to tow vehicle is additionally suitable.

What is claimed is:

1. A system for transferring operational signals between a tow vehicle and trailer, said system comprising:
   a primary controller, said primary controller circuit generating said operational signals;
   a wireless transmitter, said transmitter disposed within one of a hitch or hitch receiver coupling connected to said tow vehicle and operatively coupled to said primary controller, and
   wherein said transmitter receives said operational signals from said primary controller and transmits said signals to said trailer.

2. A system for transferring operational signals between a tow vehicle and trailer, as per claim 1, wherein said hitch comprises a ball hitch and said transmitter is embedded within the ball of said ball hitch.

3. A system for transferring operational signals between a tow vehicle and trailer, as per claim 1, wherein said transmitter comprises any of one or more inductive coils, one or more electromagnetic transmitters, one or more optical transmitters, or one or more acoustic transmitters.

4. A system for transferring operational signals between a tow vehicle and trailer, as per claim 1, said system further comprising a display unit, said display unit displaying information related to said trailer.

5. A system for transferring operational signals between a tow vehicle and trailer, as per claim 1, wherein said primary controller comprises:
   a first microprocessor;
   a modulator, said modulator coupled to said microprocessor and modulating data signals received from said microprocessor;
   a power amplifier/converter circuit, said circuit coupled between said microprocessor, said modulator and a power source, said circuit receiving said modulated data signals and generating power supply signals from said power source;
   wherein said power amplifier/converter provides said operational signals comprising said data signals and said power supply signals to said transmitter.

6. A system for transferring operational signals between a tow vehicle and trailer, as per claim 1, wherein said operational signals comprise power supply signals.

7. A system for transferring operational signals between a tow vehicle and trailer, as per claim 1, wherein said operational signals comprise data signals.

8. A system for transferring operational signals between a tow vehicle and trailer, as per claim 1, said system further comprising;
   a wireless receiver, said receiver disposed within one of a hitch or hitch receiver coupling connected to said trailer and receiving said operational signals from said transmitter;
   a secondary controller operatively coupled to said receiver, and
   wherein said receiver provides said received operational signals to said secondary controller.

9. A system for transferring operational signals between a tow vehicle and trailer, as per claim 8, wherein said secondary controller comprises:
   a second microprocessor;
   a modem, said modem demodulating said operational signals when said operational signals are data signals and providing said demodulated signals to said microprocessor;
   a power supply and storage circuit, said power supply and storage circuit storing power and providing power at least to said second microprocessor;
   a rectifier circuit, said rectifier circuit receiving said operational signals when said operational signals are power supply signals and rectifying said signals to supply power to said power supply and storage circuit, and
   wherein said second microprocessor controls one or more trailer subsystems based upon said data signals.

10. A system for transferring operational signals between a tow vehicle and trailer, as per claim 9, wherein said trailer subsystems comprise any of trailer lighting and signaling, electrical trailer brakes, obstacle warning system, task lighting, alarm system, 12 volt to 110 volt inverters, or fault detection circuitry.

11. A system for transferring operational signals between a tow vehicle and trailer, as per claim 9, said primary controller comprising:
   a first microprocessor;
   a demodulator coupled between said transmitter and said first microprocessor;
   wherein said second microprocessor provides data signals to said modem, said modem modulating said data signals and providing said data signals to said receiver, said receiver acting as a transmitter and transmitting said modulated data signals to said transmitter acting as a receiver, said demodulator demodulating said modulated data signals and providing said demodulated data signals to said first microprocessor.

12. A system for transferring operational signals between a tow vehicle and a trailer, said tow vehicle having a primary controller coupled to a wireless transmitter disposed within one of a hitch or hitch receiver coupling connected to said tow vehicle, said controller preparing said operational signals and providing said signals to said transmitter for transmission to said trailer, said system comprising:
   a wireless receiver, said receiver disposed within one of a hitch or hitch receiver coupling connected to said trailer and receiving said operational signals from said transmitter;
   a secondary controller operatively coupled to said receiver, and
   wherein said receiver provides said received operational signals to said secondary controller.

13. A system for transferring operational signals between a tow vehicle and trailer, as per claim 12, wherein said hitch is a ball hitch and said receiver is embedded within the ball of said ball hitch.

14. A system for transferring operational signals between a tow vehicle and trailer, as per claim 12, wherein said operational signals comprise power supply signals.

15. A system for transferring operational signals between a tow vehicle and trailer, as per claim 12, wherein said operational signals comprise data signals.

16. A system for transferring operational signals between a tow vehicle and trailer, as per claim 12, said system further comprising fault detection circuitry coupled to said secondary controller, said fault detection circuitry monitoring the conditions of one or more trailer subsystems.

17. A system for transferring operational signals between a tow vehicle and trailer, as per claim 12, wherein said secondary controller comprises:

a second microprocessor;

a modem, said modem demodulating said operational signals when said operational signals are data signals and providing said demodulated signals to said second microprocessor;

a power supply and storage circuit, said power supply and storage circuit storing power and providing power at least to said second microprocessor;

a rectifier circuit, said rectifier circuit receiving said operational signals when said operational signals are power supply signals and rectifying said signals to supply power to said power supply and storage circuit, and wherein said second microprocessor controls one or more trailer subsystems based upon said data signals.

18. A system for transferring operational signals between a tow vehicle and trailer, as per claim 17, wherein said trailer subsystems comprise any of trailer lighting and signaling, electrical trailer brakes, obstacle warning system, task lighting, alarm system, 12 volt to 110 volt inverters, or fault detection circuitry.

19. A system for transferring operational signals between a tow vehicle and trailer, as per claim 12, wherein said receiver comprises any of one or more inductive coils, one or more electromagnetic transmitters, one or more optical transmitters, or one or more acoustic transmitters.

20. A system for transferring operational signals between a tow vehicle and trailer, as per claim 17, wherein said primary controller comprises:

a first microprocessor;

a modulator, said modulator coupled to said first microprocessor and modulating data signals received from said first microprocessor;

a power amplifier/converter circuit, said circuit coupled between said first microprocessor, said modulator and a power source, said circuit receiving said modulated data signals and generating power supply signals from said power source;

wherein said power amplifier/converter provides said operational signals comprising said data signals and said power supply signals to said transmitter.

21. A system for transferring operational signals between a tow vehicle and trailer, as per claim 20, further comprising:

a demodulator coupled between said transmitter and said first microprocessor, and wherein said second microprocessor provides data signals to said modem, said modem modulating said data signals and providing said data signals to said receiver, said receiver acting as a transmitter and transmitting said modulated data signals to said transmitter acting as a receiver, said demodulator demodulating said modulated data signals and providing said demodulated data signals to said first microprocessor.

* * * * *